(12) United States Patent
Bichkar et al.

(10) Patent No.: US 11,773,927 B1
(45) Date of Patent: Oct. 3, 2023

(54) COMPENSATION SYSTEM AND METHOD FOR DRIVELINE DISCONNECT CLUTCH LINE PRESSURE DISTURBANCES

(71) Applicant: Ford Global Technologies, LLC, Dearborn, MI (US)

(72) Inventors: Akshay Bichkar, Ann Arbor, MI (US); Corey James Blue, Belleville, MI (US); Samuel Melville Glauber, Northville, MI (US); Jason Meyer, Canton, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/823,758

(22) Filed: Aug. 31, 2022

(51) Int. Cl.
F16D 48/06 (2006.01)
B60W 20/40 (2016.01)

(52) U.S. Cl.
CPC .......... F16D 48/066 (2013.01); *B60W 20/40* (2013.01); *B60W 2510/02* (2013.01); *B60W 2510/1075* (2013.01); *B60W 2710/021* (2013.01); *F16D 2500/10412* (2013.01); *F16D 2500/3024* (2013.01); *F16D 2500/30805* (2013.01)

(58) Field of Classification Search
None
See application file for complete search history.

(56) References Cited

U.S. PATENT DOCUMENTS

| | | | |
|---|---|---|---|
| 9,340,203 B2 | 5/2016 | Gibson et al. | |
| 10,384,665 B1 * | 8/2019 | Boyko | B60W 20/00 |
| 10,661,784 B2 | 5/2020 | Ford et al. | |
| 10,800,396 B2 | 10/2020 | Ford et al. | |

OTHER PUBLICATIONS

Bichkar, A. et al., "System and Method for Adjusting Driveline Disconnect Clutch Boost Pressure," U.S. Appl. No. 17/822,289, filed Aug. 25, 2022, 33 pages.
Bichkar, A. et al., "System and Method for Stroking a Driveline Disconnect Clutch," U.S. Appl. No. 17/938,820, filed Oct. 7, 2022, 34 pages.

* cited by examiner

*Primary Examiner* — Timothy Hannon
(74) *Attorney, Agent, or Firm* — David Kelley; McCoy Russell LLP (57) ABSTRACT

Systems and methods for operating a driveline disconnect clutch of a hybrid vehicle are presented. In one example, torque capacity of a driveline disconnect is adjusted in response to a change in commanded line pressure. The torque capacity of the driveline disconnect clutch may be adjusted in according to a maximum transmission line pressure.

20 Claims, 5 Drawing Sheets

COMPENSATION SYSTEM AND METHOD FOR DRIVELINE DISCONNECT CLUTCH LINE PRESSURE DISTURBANCES

FIELD

The present description relates to methods and a system for operating a driveline disconnect clutch of a hybrid vehicle.

BACKGROUND AND SUMMARY

A driveline disconnect clutch may be positioned between an engine and an electric machine of a hybrid vehicle. The driveline disconnect clutch may be opened when driver demand is low and battery state of charge is high to conserve fuel. The driveline disconnect clutch allows the electric machine to be selectively decoupled from the engine so that the electric machine may propel the hybrid vehicle without rotating the engine. The driveline disconnect clutch may be hydraulically actuated via transmission fluid that is supplied by a pump. The pump may also supply transmission gear clutches with fluid so that the transmission may shift between its fixed gear ratios. The output pressure of the pump may be regulated to a line pressure that is varied based on vehicle operating conditions. The line pressure is supplied to values that control driveline disconnect clutch pressure, gear clutch pressures, and other pressures within the transmission. The line pressure changes may affect driveline disconnect clutch torque capacity and driveline disconnect clutch engagement even though a valve is configured to control driveline disconnect clutch pressure downstream of a line pressure control valve. As a result, it may be possible to unintentionally increase or decrease driveline disconnect clutch pressure when the driveline disconnect is stroked, but not commanded to close or partially close. Increasing the driveline disconnect clutch pressure when the driveline disconnect clutch is stroked may increase driveline losses and increase energy consumption by the vehicle. Unintentionally decreasing the driveline disconnect clutch pressure may result in delays when actuation is desired, which may cause driveline torque disturbances.

The inventors herein have recognized the above-mentioned issue and have developed a method for operating a vehicle, comprising: via one or more controllers, commanding an adjustment to a driveline disconnect clutch pressure in response to a change in commanded transmission line pressure.

By adjusting driveline disconnect clutch pressure in response to a change in transmission line pressure, it may be possible to reduce a possibility of driveline torque disturbances. Specifically, the possibility of driveline torque disturbances may be reduced by adjusting driveline disconnect clutch pressure opposite to a change in commanded transmission line pressure so as to counteract the change in actual transmission line pressure. In this way, changes in line pressure to accommodate gear shifting and other operating conditions may be compensated so that driveline torque disturbances caused by driveline disconnect clutch pressure changes while a driveline disconnect clutch is stroked or in the process of closing may be reduced.

The present description may provide several advantages. In particular, the approach may reduce driveline torque disturbances. Further, the approach may reduce driveline losses via reducing driveline disconnect clutch drag when the driveline disconnect clutch is not commanded closed. Additionally, the approach may improve a vehicle's drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
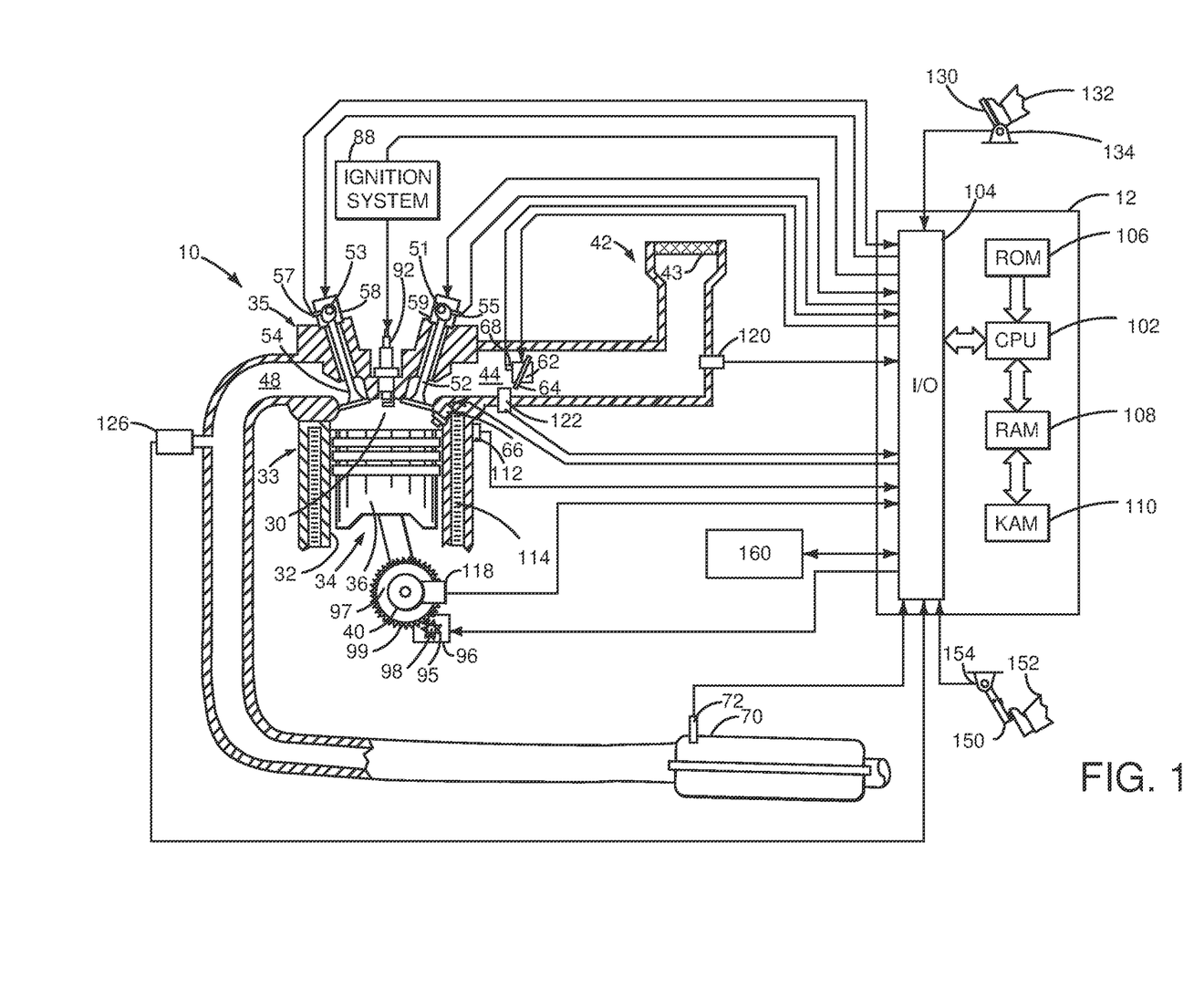
FIG. 1 is a schematic diagram of an engine.
Figure 2:
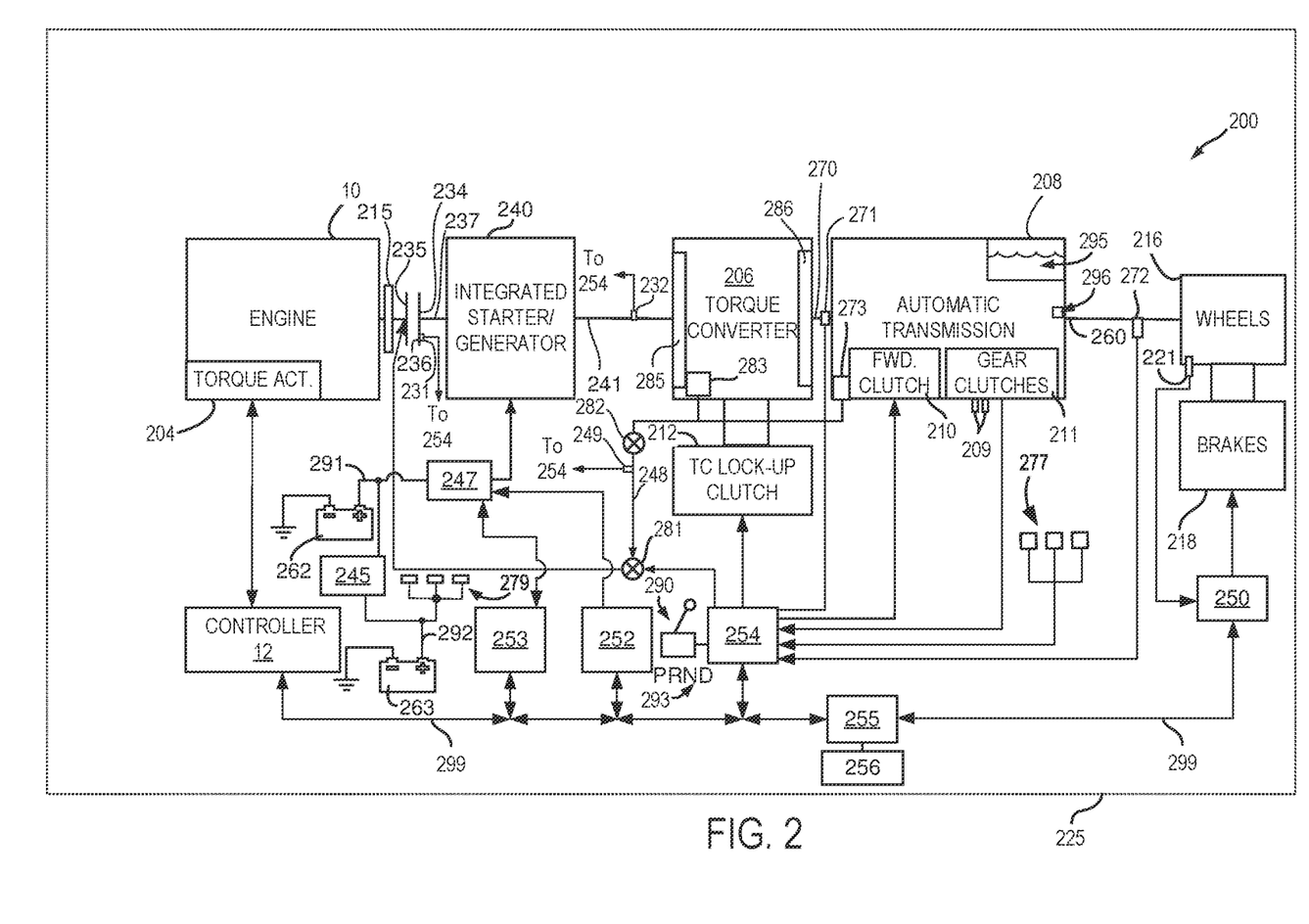
FIG. 2 is a schematic diagram of a hybrid vehicle driveline including the engine of FIG. 1.
Figure 3:
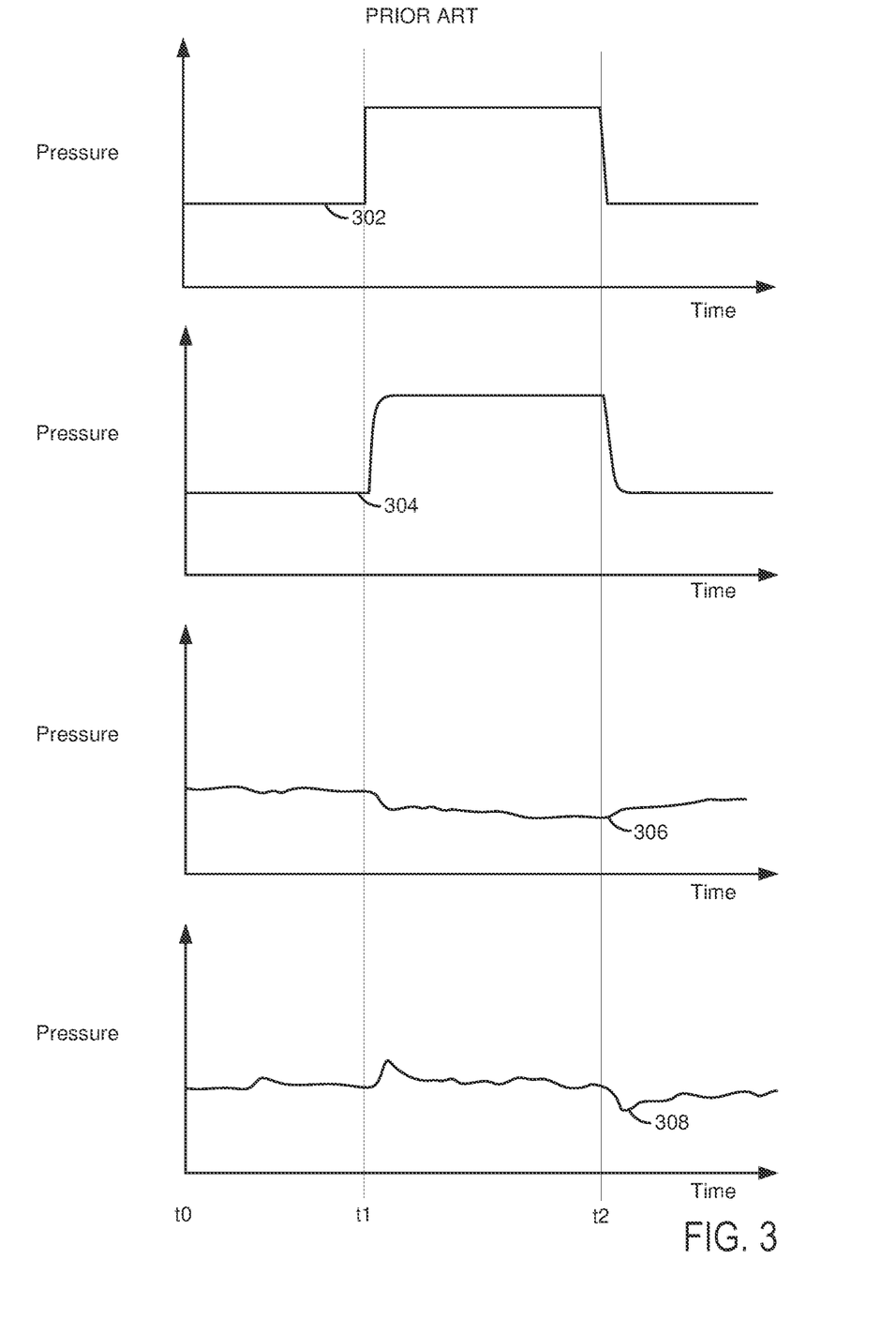
FIG. 3 shows pressure plots during changes of line pressure for a driveline disconnect clutch that is closed-loop controlled.
Figure 4:
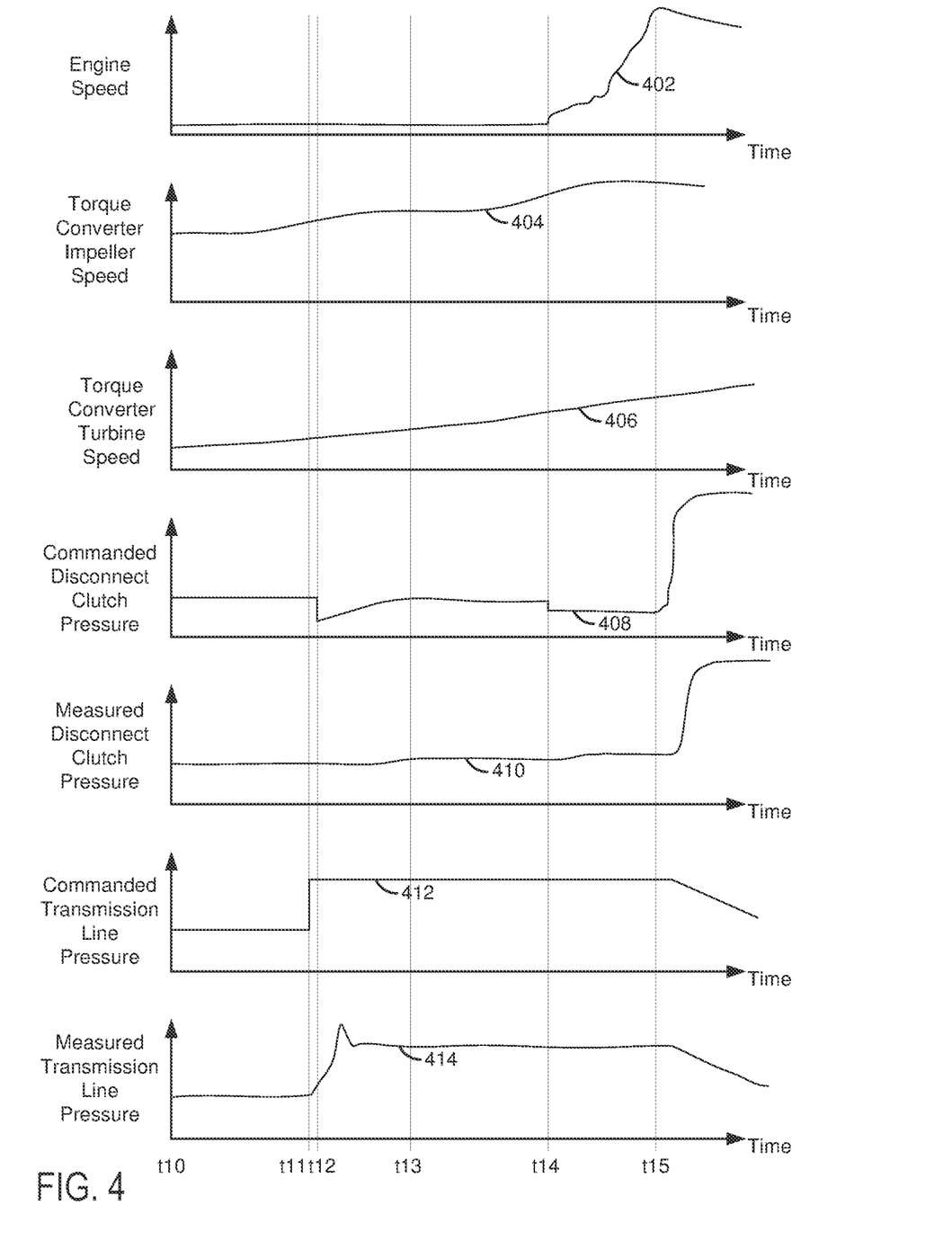
FIG. 4 shows an engine starting sequence in which a line pressure change is compensated via a feedforward adjustment.
Figure 5:
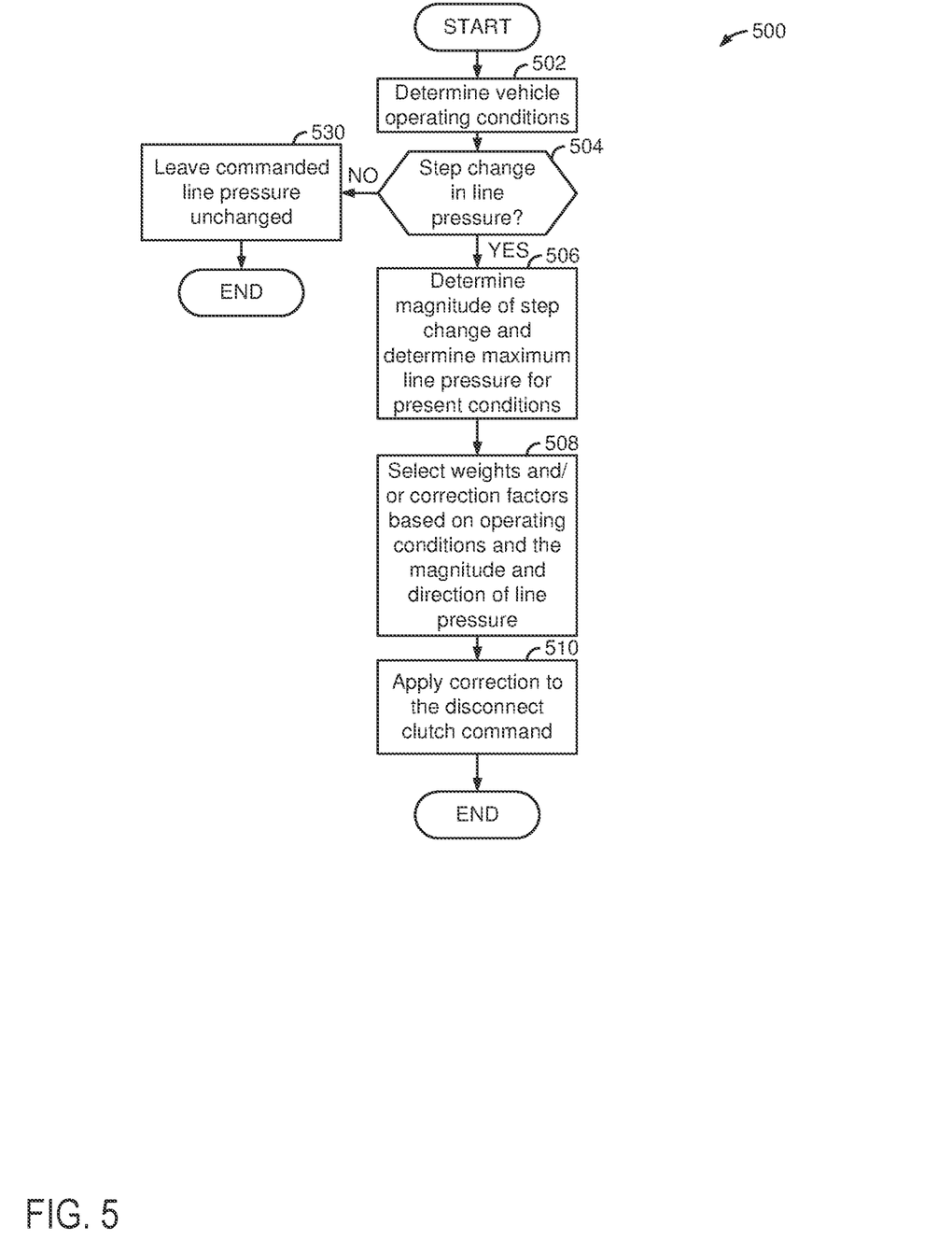
FIG. 5 shows a method for controlling a driveline disconnect clutch.

The present description is related to improving operation of a driveline disconnect clutch of a hybrid vehicle. In particular, control of pressure within the driveline disconnect clutch may be compensated for changes in line pressure of a line that supplies transmission fluid to the driveline disconnect clutch. The compensation may allow the driveline disconnect clutch to stay at a target or desired pressure even during the presence of line pressure changes. As a result, control of the driveline disconnect clutch may be more consistent when the driveline disconnect clutch is commanded closed. The driveline may include an engine of the type that is shown in FIG. 1. The engine may be part of a hybrid powertrain or driveline as shown in FIG. 2. Prior art compensation for line pressure is shown in FIG. 3. An operating sequence according to the method of FIG. 5 is shown in FIG. 4. FIG. 5 shows a flowchart of a method for controlling a driveline disconnect clutch.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid in line 248 that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line or conduit 248 may receive transmission fluid 295 from electric transmission fluid pump 273 and/or pump 283. Pressure in conduit 248 (e.g., line pressure) may be sensed via pressure sensor 249 and pressure in driveline disconnect clutch 236 may be sensed via pressure sensor 231.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271 and speed of electric machine 240 via position sensor 232. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; and a controller including executable instructions stored in non-transitory memory that cause the controller to adjust a driveline disconnect clutch pressure command for a predetermined amount of time in response to a change in a transmission line pressure. In a first example, the system includes where the change in the transmission line pressure is determined from a commanded line pressure. In a second example that may include the first example, the system includes where the change in transmission line pressure is determined via a pressure sensor. In a third example that may include the one or both of the first and second examples, the system further comprises additional instructions to estimate a maximum transmission line pressure based on vehicle operating conditions. In a fourth example that may include one or more of the first through third examples, the system includes where the driveline disconnect clutch pressure is adjusted responsive to the maximum transmission line pressure. In a fifth example that may include one or more of the first through fourth examples, the system includes where the driveline disconnect clutch pressure is adjusted responsive to transmission fluid temperature.

Referring now to FIG. 3, a prior art response to a step change in transmission line pressure is shown. The vertical lines at times t0-t3 represent times of interest in the plots. The plots are time aligned. The driveline disconnect clutch pressure is attempted to be maintained at a constant value throughout the sequence of FIG. 3 and it is feedback controlled to this constant value.

The first plot from the top of FIG. 3 is a commanded transmission line pressure. The commanded transmission line pressure may be a pressure that is commanded to occur in a transmission line at a location that is downstream from a line pressure control valve and a pump. The commanded line pressure is a pressure command that the line pressure control valve (e.g., 282 of FIG. 2) regulates or controls to in a line or passage. For example, the line pressure control valve may be commanded to regulate line pressure in line 248 to 680 kilopascals. The vertical axis represents pressure and pressure increases in the direction of the vertical axis arrow. The horizontal axis represents time and time increases from the left side of the plot to the right side of the plot. Trace 302 represents the pressure value of the commanded transmission line pressure.

The second plot from the top of FIG. 3 is an estimated transmission line pressure. The estimated transmission line pressure may be a pressure that is estimated via a model. The vertical axis represents pressure and pressure increases in the direction of the vertical axis arrow. The horizontal axis represents time and time increases from the left side of the plot to the right side of the plot. Trace 304 represents the pressure value of the estimated transmission line pressure.

The third plot from the top of FIG. 3 is a feedback based commanded driveline disconnect clutch pressure. The feedback based commanded driveline disconnect clutch pressure is a driveline disconnect clutch command pressure that is based on a difference between commanded driveline disconnect clutch pressure and actual or measured driveline disconnect clutch pressure. The feedback based commanded driveline disconnect clutch pressure reacts to an error between commanded driveline disconnect clutch pressure and measured driveline disconnect clutch pressure. The vertical axis represents pressure and pressure increases in the direction of the vertical axis arrow. The horizontal axis represents time and time increases from the left side of the plot to the right side of the plot. Trace 306 represents the feedback based commanded driveline disconnect clutch pressure.

The fourth plot from the top of FIG. 3 is a measured driveline disconnect clutch pressure. The measured driveline disconnect clutch pressure may be measured via sensor 231 of FIG. 2. The vertical axis represents pressure and pressure increases in the direction of the vertical axis arrow. The horizontal axis represents time and time increases from the left side of the plot to the right side of the plot. Trace 308 represents the measured driveline disconnect clutch pressure.

At time t0, the transmission line pressure command is at a middle level and the estimated transmission line pressure is also at the middle level. The feedback based commanded driveline disconnect clutch pressure is at a middle level and the measured driveline disconnect clutch pressure is at a middle level.

At time t1, a step up change in the transmission line pressure command is made and the estimated transmission line pressure begins to increase following the transmission line pressure command. The measured driveline disconnect clutch pressure begins to increase shortly after the step up change in the line pressure command is generated. The feedback based commanded driveline disconnect clutch pressure is unchanged, but it begins to decrease shortly after the measured driveline disconnect clutch pressure begins to increase in response to the transmission line pressure command. The feedback based commanded driveline disconnect clutch pressure is reduced to compensate for the increase in the measured driveline disconnect clutch pressure so that pressure in the driveline disconnect clutch may be maintained constant. However, it takes time for the feedback control to drive the error value to zero after the measured driveline disconnect clutch pressure begins to change. The feedback control eventually drives the driveline disconnect clutch pressure error to zero, but driveline disconnect clutch operation may be disrupted during the time when the measured driveline disconnect clutch pressure is not maintained at the constant value.

At time t2, a step down change in the transmission line pressure command is made and the estimated transmission line pressure begins to decrease following the transmission line pressure command. The measured driveline disconnect clutch pressure begins to decrease shortly after the step down change in the line pressure command is generated. The feedback based commanded driveline disconnect clutch pressure is unchanged, but it begins to increase shortly after the measured driveline disconnect clutch pressure begins to decrease in response to the transmission line pressure command. The feedback based commanded driveline disconnect clutch pressure is increased to compensate for the decrease in the measured driveline disconnect clutch pressure so that pressure in the driveline disconnect clutch may be maintained constant. Nevertheless, it takes time for the feedback control to drive the error value to zero after the measured driveline disconnect clutch pressure begins to change. The feedback control eventually drives the driveline disconnect clutch pressure error to zero, but driveline disconnect clutch operation may be disrupted during the time when the measured driveline disconnect clutch pressure is not maintained at the constant value.

Thus, the feedback compensation eventually reduces the driveline disconnect clutch pressure to its requested or desired value after a step up or step down in the transmission line pressure. Yet, during the time that the measured pressure is being driven back to a constant value, the driveline disconnect clutch drag may increase. In addition, if the driveline disconnect clutch is commanded closed during the time that the measured driveline disconnect clutch pressure is not equal to the constant value (e.g., a requested driveline disconnect clutch pressure), the driveline disconnect clutch pressure immediately prior to the time that the driveline disconnect clutch close command is generated may influence the boost pressure and boost duration so as to cause over boost or under boost. The over boost or under boost may cause driveline torque disturbances.

Referring now to FIG. 4, a prophetic driveline operating sequence is shown. The operating sequence of FIG. 4 may be provided via the system of FIGS. 1 and 2 in cooperation with the method of FIG. 5. The vertical lines at times t10-t15 represent times of interest during the operating sequence. The plots are time aligned. The operating sequence of FIG. 4 shows how step changes in transmission line pressure may be compensated so as to reduce driveline disconnect clutch generated torque disturbances during or preceding engine starting via flywheel starter 96 followed by closing a driveline disconnect clutch.

The first plot from the top of FIG. 4 is a plot of engine speed versus time. The vertical axis represents engine speed and engine speed increases in the direction of the vertical axis arrow. The horizontal axis represents time and time increases from the left side of the plot to the right side of the plot. Trace 402 represents engine speed.

The second plot from the top of FIG. 4 is a plot of torque converter impeller speed versus time. The vertical axis represents torque converter impeller speed and torque converter impeller increases in the direction of the vertical axis arrow. The horizontal axis represents time and time increases from the left side of the plot to the right side of the plot. Trace 404 represents torque converter impeller speed.

The third plot from the top of FIG. 4 is a plot of torque converter turbine speed versus time. The vertical axis represents torque converter turbine speed and torque converter turbine increases in the direction of the vertical axis arrow. The horizontal axis represents time and time increases from the left side of the plot to the right side of the plot. Trace 406 represents torque converter turbine speed.

The fourth plot from the top of FIG. 4 is a plot of commanded driveline disconnect clutch pressure versus time. The vertical axis represents the commanded driveline disconnect clutch pressure and commanded driveline disconnect clutch pressure increases in the direction of the vertical axis arrow. The horizontal axis represents time and time increases from the left side of the plot to the right side of the plot. Trace 408 represents the commanded driveline disconnect clutch pressure.

The fifth plot from the top of FIG. 4 is a plot of measured or observed driveline disconnect clutch pressure versus time. The vertical axis represents the measured or observed driveline disconnect clutch pressure and the measured or observed driveline disconnect clutch pressure increases in the direction of the vertical axis arrow. The horizontal axis is where the measured or observed driveline disconnect clutch pressure is zero. The horizontal axis represents time and time increases from the left side of the plot to the right side of the plot. Trace 410 represents the measured or observed driveline disconnect clutch pressure.

The sixth plot from the top of FIG. 4 is a plot of commanded transmission line pressure (e.g., regulated pressure output of the transmission pump) versus time. The vertical axis represents commanded transmission line pressure and commanded transmission line pressure increases in the direction of the vertical axis arrow. The horizontal axis represents time and time increases from the left side of the plot to the right side of the plot. Trace 412 represents the commanded transmission line pressure.

The seventh plot from the top of FIG. 4 is a plot of measured or observed transmission measured or observed line pressure increases in the direction of the vertical axis arrow. The horizontal axis represents time and time increases from the left side of the plot to the right side of the plot. Trace 414 represents the measured or observed line pressure.

At time t10, the engine is stopped and driver demand (not shown) is slowly increasing, which causes the torque converter turbine and impeller speeds to increase. The driveline disconnect clutch pressure command is at a lower level and the measured driveline disconnect clutch pressure is at a lower level. The transmission line pressure command is at a medium level and the measured transmission line pressure is at a medium level.

At time t11, a step change in commanded transmission line pressure is generated. The step change in commanded line pressure may be due to a transmission gear change or a change in other transmission operating conditions. A step change may be described as a change in a value that exceeds the value immediately before the change in the value by more than a threshold amount in less than a threshold amount of time. For example, a step change in the commanded transmission line pressure may be described as a commanded change in transmission line pressure that exceeds the commanded transmission line pressure immediately before the change in commanded transmission line pressure by more than a threshold amount (e.g., 10%) in less than 50 milliseconds. Thus, if commanded transmission line pressure is 680 kilopascals and the commanded transmission line pressure changes to 750 kilopascals in 50 milliseconds, then it may be determined that there has been a step change in commanded transmission line pressure. In this example, the step change in commanded transmission line pressure is a positive or increasing step change in commanded transmission line pressure. The measured transmission line pressure begins to increase shortly after the commanded transmission line pressure increases. Shortly after time t11, the commanded driveline disconnect clutch pressure is decreased in response to the positive step change in commanded transmission line pressure. The decrease in commanded driveline disconnect clutch pressure compensates for the step change in commanded transmission line pressure so that the measured driveline disconnect clutch pressure increase that is due to the step change in commanded line pressure may be reduced. In this example, the measured driveline disconnect clutch pressure changes very little. The driver demand continues to increase at time t11 (not shown).

At time t12, according to the method of FIG. 5, the commanded driveline disconnect clutch pressure begins to be adjusted via a correction profile. In this example, the correction profile reduces the commanded driveline disconnect clutch pressure by jumping to a lower level and then gradually increasing the commanded driveline disconnect clutch pressure until time t13 where the correction profile value is zero. Thus, at time t13 the commanded driveline disconnect clutch pressure is no longer adjusted via the correction profile.

Shortly before time t14, the flywheel starter 96 begins to crank the engine (not shown) so that engine speed begins to increase. The driveline disconnect clutch pressure is decreased and the measured driveline disconnect clutch pressure increases due to increase in engine speed as the engine is cranked. The engine speed continues increasing and the torque converter impeller speed and turbine speed continue to increase. The commanded line pressure is constant and the measured line pressure is constant.

At time t15, the commanded driveline disconnect clutch pressure begins to increase rapidly to close the driveline disconnect clutch. The measured driveline disconnect clutch pressure increases at a higher rate a short time after the commanded driveline disconnect clutch pressure begins to increase at the higher rate. The engine is started and engine speed is elevated. The torque converter impeller speed begins to decrease and the torque converter turbine speed continues increasing. The commanded transmission line pressure and the measured transmission line pressure begin to be reduced shortly after time t15.

In this way, the commanded driveline disconnect clutch pressure may be commanded to counteract step changes in commanded transmission line pressure. In particular, the commanded driveline disconnect clutch pressure may be adjusted in a direction that is opposite to the way that the commanded transmission line pressure is changed so that measured driveline disconnect clutch pressure is unchanged or substantially unchanged (e.g., change by less than a threshold amount, such as by less than 10% of reading).

Referring now to FIG. 5, a method for operating an engine of a hybrid vehicle is shown. The method of FIG. 5 may be at least partially implemented as executable instructions stored in memory of one or more controllers in the system of FIGS. 1 and 2. Further, the method of FIG. may include actions taken in the physical world by a controller to transform an operating state of the system of FIGS. 1 and 2. Additionally, the method of FIG. 5 may provide at least portions of the operating sequence shown in FIG. 4.

At 502, method 500 determines vehicle operating conditions. Vehicle operating conditions may include but are not limited to vehicle speed, driver demand torque or power, engine temperature, integrated starter/generator speed and torque, engine speed, transmission line pressure, commanded transmission line pressure, and state of battery charge. Method 500 proceeds to 504.

At 504, method 500 judges whether or not there is a step change in the commanded transmission line pressure. In one example, method 500 may monitor one or more variables in controller RAM to determine if there has been a step change in commanded transmission line pressure. The step change in commanded line pressure may be described as a change in commanded transmission line pressure that exceeds a threshold amount in less than a threshold amount of time. In other examples, method 500 may monitor transmission line pressure via a pressure sensor. If method 500 judges that there has been a step change in commanded transmission line pressure, the answer is yes and method 500 proceeds to 506. Otherwise, the answer is no and method 500 proceeds to 530.

At 530, method 500 leaves the commanded driveline disconnect clutch pressure at its present value without any corrections applied due to changes in line pressure. Method 500 proceeds to exit.

At 506, method 500 estimates a magnitude of the step change in commanded transmission line pressure and method 500 estimates a maximum transmission line pressure for the present transmission operating conditions. Method 500 may estimate the maximum transmission line pressure for the present operating condition via the following equation: MAX_line_press=f(trans_tmp, pmp_spd), where MAX_line_press is the maximum transmission line pressure, f is a function that returns the maximum transmission line pressure, trans_tmp is the temperature of transmission fluid, and pmp_spd is the present transmission pump speed. The function f may be implemented as a table or function of empirically determined values that are obtained via requesting maximum transmission line pressure at different transmission pump speeds. Method 500 also estimates the commanded line pressure via the following equation: CMD_line_press_chg=MIN(CMD_line_press (k), MAX_line_pres (k))-CMD_line_press (k−1), where CMD_line_press_chg is the commanded transmission line pressure change, MIN is a function that returns a minimum of arguments CMD_line press and MAX_line_pres, CMD_line_press is the commanded transmission line pressure, and k is a sample number. The commanded transmission line pressure change may be in a positive direction or in a negative direction depending on the sign of the CMD_line_press_chg. Method 500 proceeds to 508.

At 508, method 500 selects weights and/or correction factors for making adjustments to a feed forward correction profile. The weights and/or correction factors may be a function of transmission fluid temperature, torque converter impeller speed, the magnitude of the commanded transmission line pressure, and the direction of the step change in the commanded transmission line pressure. The weights and/or correction factors may be stored in functions or tables in controller memory that are indexed or referenced by transmission fluid temperature, torque converter impeller speed, the magnitude of the commanded transmission line pressure, and the direction of the step change in the commanded transmission line pressure. The weights and/or correction factors may be determined via manually inducing line pressure changes and empirically adjusting weights and/or correction factors in tables/functions such that the adjusted correction profile commands the driveline disconnect clutch pressure in a way that results in no or substantially no change in driveline disconnect clutch pressure in response to changes in transmission line pressure. Method 500 proceeds to 510.

At 510, method 500 applies a feed forward correction profile to the commanded driveline disconnect clutch pressure. The feed forward correction profile may be stored in controller memory and the feed forward correction profile may be adjusted by applying the weights/correction factors determined at step 508. For example, values in the feed forward correction profile may be multiplied by a weight retrieved at 508 to scale the amplitude or magnitude of the feed forward correction profile. In addition, a rate that the feed forward correction profile is ramped to a value of zero may be adjusted via multiplying the rate by a correction factor that was retrieved at step 508. The weights and/or correction factors may adjust the magnitude, ramp rate (e.g., rate of increase or decrease of the feed forward correction profile), and/or the duration of the feed forward correction profile. The adjusted correction profile is then added to the commanded driveline disconnect clutch pressure and the position of the driveline disconnected clutch is adjusted according to the adjusted correction profile and the commanded disconnect clutch pressure.

The feed forward correction profile may increase the driveline disconnect clutch pressure command in response to a decreasing transmission line pressure. Alternatively or in addition, the feed forward correction profile may decrease driveline disconnect clutch pressure command in response to an increase in the transmission line pressure. The driveline disconnect clutch command may be increased for a predetermined amount of time and then the driveline disconnect clutch command may be gradually increased or decreased for a predetermined amount of time such that the feed forward correction profile returns to a value of zero. The commanded driveline disconnect clutch pressure may be transmitted to a value so that driveline disconnect clutch pressure follows the driveline disconnect clutch pressure command. Method 500 proceeds to exit.

In this way, a driveline disconnect clutch pressure or torque capacity command may be adjusted without feedback correction to compensate for changes in the transmission line pressure that may or may not be related to operating the driveline disconnect clutch. The compensation may operate to maintain the driveline disconnect clutch at a constant pressure in the presence of step changes in the transmission line pressure.

The method of FIG. 5 provides for a method for operating a vehicle, comprising: via one or more controllers, commanding an adjustment to a driveline disconnect clutch pressure (e.g., without feedback correction of driveline disconnect clutch pressure) in response to a change in transmission line pressure. In a first example, the method includes where commanding the adjustment to the driveline disconnect clutch pressure includes increasing the driveline disconnect clutch pressure in response to a decrease in the transmission line pressure. In a second example that may include the first example, the method includes where the driveline disconnect clutch pressure is increased for a predetermined amount of time. In a third example that may include one or both of the first and second examples, the method includes where commanding the adjustment to the driveline disconnect clutch pressure includes decreasing the driveline disconnect clutch pressure in response to an increase in the transmission line pressure. In a fourth example that may include one or more of the first through third examples, the method includes where the driveline disconnect clutch pressure is decreased for a predetermined amount of time. In a fifth example that may include one or more of the first through fourth examples, the method includes where the change in transmission line pressure is commanded via a controller. In a sixth example that may include one or more of the first through fifth examples, the method includes where the change in transmission line pressure is indicated via a rise in pressure in a line or conduit. In a seventh example that may include one or more of the first through sixth examples, the method includes where the transmission line pressure is a regulated output pressure of a transmission pump. In an eighth example that may include one or more of the first through seventh examples, the method includes where the change in transmission line pressure is a step change.

The method of FIG. 5 also provides for a method for operating a vehicle, comprising: via one or more controllers, estimate a maximum transmission line pressure in response to a commanded line pressure; and commanding an adjustment to a driveline disconnect clutch pressure in response to the maximum transmission line pressure. In a first example, the method includes where the adjustment is a function of transmission fluid temperature. In a second example that may include the first example, the method includes where the adjustment is an increase in response to a decrease in the commanded line pressure. In a third example that may include one or both of the first and second examples, the method includes where the adjustment is a decrease in response to an increase in the commanded line pressure. In a fourth example that may include one or more of the first through third examples, the method includes where commanding the adjustment includes commanding the adjustment for a predetermined amount of time. In a fifth example that may include one or more of the first through fourth examples, the method includes where commanding the adjustment includes shaping and ramping out the adjustment in the predetermined amount of time.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers, commanding an adjustment to a driveline disconnect clutch pressure for a predetermined amount of time in response to a change in transmission line pressure.

2. The method of claim 1, where commanding the adjustment to the driveline disconnect clutch pressure includes increasing the driveline disconnect clutch pressure in response to a decrease in the transmission line pressure.

3. The method of claim 2, where the driveline disconnect clutch pressure is increased for the predetermined amount of time.

4. The method of claim 1, where commanding the adjustment to the driveline disconnect clutch pressure includes decreasing the driveline disconnect clutch pressure in response to an increase in the transmission line pressure.

5. The method of claim 4, where the driveline disconnect clutch pressure is decreased for the predetermined amount of time.

6. The method of claim 1, where the change in transmission line pressure is commanded via a controller and the commanding of the adjustment to the driveline disconnect clutch pressure is in response to a maximum transmission line pressure.

7. The method of claim 6, where the change in transmission line pressure is indicated via a rise in pressure in a line or conduit.

8. The method of claim 7, where the transmission line pressure is a regulated output pressure of a transmission pump.

9. The method of claim 1, where the change in transmission line pressure is a step change in pressure.

10. A system, comprising:
an internal combustion engine;
an integrated starter/generator;
a disconnect clutch positioned in a driveline between the internal combustion engine and the integrated starter/generator;
a transmission included in the driveline; and
a controller including executable instructions stored in non-transitory memory that cause the controller to adjust a driveline disconnect clutch pressure command for a predetermined amount of time in response to a change in a transmission line pressure.

11. The system of claim 10, where the change in the transmission line pressure is determined from a commanded transmission line pressure.

12. The system of claim 10, where the change in transmission line pressure is determined via a pressure sensor.

13. The system of claim 10, further comprising additional instructions to estimate a maximum transmission line pressure based on vehicle operating conditions.

14. The system of claim 13, where the driveline disconnect clutch pressure command is adjusted responsive to the maximum transmission line pressure.

15. The system of claim 13, where the driveline disconnect clutch pressure command is adjusted responsive to transmission fluid temperature.

16. A method for operating a vehicle, comprising:
via one or more controllers, estimate a maximum transmission line pressure in response to a commanded transmission line pressure; and
commanding an adjustment to a driveline disconnect clutch pressure in response to the maximum transmission line pressure.

17. The method of claim 16, where the adjustment is a function of transmission fluid temperature.

18. The method of claim 16, where the adjustment is an increase in response to a decrease in the commanded transmission line pressure.

19. The method of claim 16, where the adjustment is a decrease in response to an increase in the commanded transmission line pressure.

20. The method of claim 16, where commanding the adjustment includes shaping and ramping out the adjustment in a predetermined amount of time.

\* \* \* \* \*